(12) United States Patent
Yamada (10) Patent No.: US 9,809,940 B2
(45) Date of Patent: Nov. 7, 2017

(54) PNEUMATIC FENDER AND MOUTH PIECE METAL FOR PNEUMATIC FENDER

(71) Applicant: The Yokohama Rubber Co., LTD., Minato-ku, Tokyo (JP)

(72) Inventor: Shu Yamada, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/300,976

(22) PCT Filed: Mar. 24, 2015

(86) PCT No.: PCT/JP2015/058949
§ 371 (c)(1),
(2) Date: Sep. 30, 2016

(87) PCT Pub. No.: WO2015/151937
PCT Pub. Date: Oct. 8, 2015

(65) Prior Publication Data
US 2017/0022678 A1  Jan. 26, 2017

(30) Foreign Application Priority Data
Mar. 31, 2014  (JP) .................................. 2014-071321

(51) Int. Cl.
*B63B 59/02* (2006.01)
*E02B 3/26* (2006.01)
(Continued)

(52) U.S. Cl.
CPC ................ *E02B 3/26* (2013.01); *B63B 59/02* (2013.01); *F16K 17/00* (2013.01); *F16K 17/04* (2013.01); *B63B 2059/025* (2013.01)

(58) Field of Classification Search
CPC ............ G01L 17/00; B63B 59/02; E02B 3/26
(Continued)

(56) References Cited

U.S. PATENT DOCUMENTS 3,938,840 A * 2/1976 Haase .................... B60R 19/20
188/298
4,099,759 A * 7/1978 Kornhauser ............ B60R 19/20
267/116

(Continued)

FOREIGN PATENT DOCUMENTS

JP  2000-088690  3/2000
JP  2002-115768  4/2002

(Continued)

OTHER PUBLICATIONS

International Search Report for International Application No. PCT/JP2015/058949 dated Jun. 16, 2015, 4 pages, Japan.

*Primary Examiner* — Christopher Schwartz
(74) *Attorney, Agent, or Firm* — Thorpe North & Western (57) ABSTRACT

A pneumatic fender and a mouth piece metal with an open/close valve is biased by a resilient member toward a closing direction of a through hole formed on a dividing wall constituting a receiving chamber. A safety valve is isolated from a cavity of a fender bladder by a receiving chamber, thus allowing the safety valve to be able to be detached and attached while the pneumatic fender is in use. A confirmation test of a valve opening pressure of the safety valve is performed by opening a receiving chamber open/close valve and raising an internal pressure of a cavity of the receiving chamber to a pressure threshold (Pm) via a receiving chamber communication passage. Upon an internal pressure (P) of the cavity being less than the pressure threshold (Pm) and greater than a standard pressure (Pc), the open/close valve opens the through hole, thus allowing the safety valve to function.

12 Claims, 5 Drawing Sheets

(51) Int. Cl.
*F16K 17/00* (2006.01)
*F16K 17/04* (2006.01)

(58) Field of Classification Search
USPC ......... 114/219; 188/298; 267/116, 122, 123; 293/107, 110, 132, 134
See application file for complete search history.

(56) References Cited

U.S. PATENT DOCUMENTS

| | | | | |
|---|---|---|---|---|
| 4,176,858 | A * | 12/1979 | Kornhauser | B60R 19/20 280/734 |
| 6,126,214 | A * | 10/2000 | Kim | B60R 19/20 251/76 |
| 2013/0076536 | A1* | 3/2013 | Nakatani | G08C 17/02 340/870.02 |
| 2014/0305360 | A1* | 10/2014 | Yamada | B63B 59/02 114/219 |
| 2017/0016195 | A1* | 1/2017 | Yamada | B63B 59/02 |

FOREIGN PATENT DOCUMENTS

| | | |
|---|---|---|
| JP | 2003-129446 | 5/2003 |
| JP | 2013-076609 | 4/2013 |
| WO | WO 2013/046832 | 4/2013 |

\* cited by examiner

PNEUMATIC FENDER AND MOUTH PIECE METAL FOR PNEUMATIC FENDER

TECHNICAL FIELD

The present technology relates to a pneumatic fender and a mouth piece metal for a pneumatic fender, and further relates to a pneumatic fender and a mouth piece metal for a pneumatic fender with significantly enhanced maintainability wherein a safety valve can be detached and attached and a confirmation test of the valve opening pressure of the safety valve can be performed on the pneumatic fender while in use, and the labor and time required for these operations are greatly reduced.

BACKGROUND ART

Pneumatic fenders are designed to have air sealed in the cavity of a fender bladder so as to be provided with predetermined performance such as shock absorbing performance. If the fender bladder remains sealed when the fender is excessively compressed, the internal pressure in the cavity may increase beyond a preset pressure threshold and cause failure of the fender bladder. To combat this, a safety valve that connects the cavity to the outside air may be provided on a mouth piece metal provided on the fender bladder for such cases when the internal pressure of the cavity of the fender bladder exceeds the pressure threshold (see, for example, Japanese Unexamined Patent Application Publication No. 2003-129446A).

Such a safety valve is routinely (for example, every 1 to 3 years) detached from the mouth piece metal for confirmation testing of the valve opening pressure, cleaning, and other such maintenance. However, the cavity of the fender bladder of such a pneumatic fender when in use is inflated to a predetermined internal pressure, and so detaching the safety valve from the mouth piece metal of the fender bladder when the pneumatic fender is in use would result in air being violently ejected from the cavity. Thus, such detachment of the safety valve is not possible. Accordingly, the detachment of the safety valve is performed after sufficiently discharging the air from the cavity of the fender bladder. Specifically, to detach the safety valve from the mouth piece metal, the in-use pneumatic fender is brought onto land or a marine vessel before the air is discharged. Upon completion of the confirmation testing of the valve opening pressure, cleaning, and the like of the detached safety valve, the safety valve must be reattached to the mouth piece metal, the cavity of the fender bladder must be inflated with air, and the pneumatic fender must be installed in a predetermined position. Accordingly, the maintenance of detaching and attaching the safety valve to the mouth piece metal requires a great deal of man-hours and time.

SUMMARY

The present technology provides a pneumatic fender and a mouth piece metal for a pneumatic fender with significantly enhanced maintainability wherein a safety valve can be attached and detached and a confirmation test of the valve opening pressure of the safety valve can be performed on the pneumatic fender while in use, and the labor and time required for these operations are greatly reduced.

A pneumatic fender comprises:
a fender bladder including a cylindrical portion and bowl-like hemispherical portions connected to each end of the cylindrical portion;
a mouth piece metal disposed on at least one of the hemispherical portions,
the mouth piece metal including:
a safety valve that, upon an internal pressure of a cavity of the fender bladder reaching a pressure threshold, opens to connect the cavity of the fender bladder to outside air and reduce the internal pressure, and
a communication passage that connects the cavity of the fender bladder and outside air; and
an bladder open/close valve that opens and closes the communication passage; wherein
the mouth piece metal further includes:
a receiving chamber that isolates the safety valve from the cavity of the fender bladder,
a through hole that connects a cavity of the receiving chamber and the cavity of the fender bladder, the through hole being formed on a dividing wall constituting the receiving chamber,
an open/close valve that opens and closes the through hole,
a resilient member that constantly biases the open/close valve toward a closing direction of the through hole,
a receiving chamber communication passage that connects the cavity of the receiving chamber and outside air, and
a receiving chamber open/close valve that opens and closes the receiving chamber communication passage; and
upon the internal pressure of the cavity of the fender bladder being less than the pressure threshold and greater than a standard pressure, which is a sum of a predetermined initial internal pressure and an allowable pressure, the open/close valve opens, opening the closed through hole.

A mouth piece metal for a pneumatic fender comprises:
a safety valve that, upon an internal pressure of a cavity of a fender bladder reaching a pressure threshold, opens to connect the cavity of the fender bladder to outside air and reduce the internal pressure;
a communication passage that connects the cavity of the fender bladder and outside air; and
a bladder open/close valve that opens and closes the communication passage;
the mouth piece metal being attached to a bowl-like hemispherical portion constituting the fender bladder;
wherein the mouth piece metal further includes:
a receiving chamber that isolates the safety valve from the cavity of the fender bladder,
a through hole that connects a cavity of the receiving chamber and the cavity of the fender bladder, the through hole being formed on a dividing wall constituting the receiving chamber,
an open/close valve that opens and closes the through hole,
a resilient member that constantly biases the open/close valve toward a closing direction of the through hole,
a receiving chamber communication passage that connects the cavity of the receiving chamber and outside air, and
a receiving chamber open/close valve that opens and closes the receiving chamber communication passage; and
upon the internal pressure of the cavity of the fender bladder being less than the pressure threshold and greater than a standard pressure, which is a sum of a predetermined initial internal pressure and an allowable pressure, the open/close valve opens, opening the closed through hole.

According to the present technology, the mouth piece metal includes a receiving chamber that isolates the safety valve from the cavity of the fender bladder, a through hole that connects a cavity of the receiving chamber and the cavity of the fender bladder, the through hole being formed on a dividing wall constituting the receiving chamber, an open/close valve that opens and closes the through hole, and a resilient member that constantly biases the open/close valve toward a closing direction of the through hole, wherein upon the internal pressure of the cavity of the fender bladder being less than the pressure threshold and greater than a standard pressure, which is a sum of a predetermined initial internal pressure and an allowable pressure, the open/close valve opens, opening the closed through hole. Thus, when the internal pressure of the cavity of the fender bladder reaches or exceeds the pressure threshold, the open/close valve opens, and the cavity of the fender bladder and the cavity of the receiving chamber are connected via the through hole and the safety valve opens. Accordingly, the safety valve functions as per convention and prevents damage by reducing the internal pressure of the cavity of the fender bladder when excessively compressed.

When the internal pressure of the cavity of the fender bladder is equal to or less than the standard pressure, which is the sum of the predetermined initial internal pressure and the allowable pressure, the open/close valve closes and the through hole is closed. Accordingly, in the typical in-use state of the fender bladder, the through hole is closed and the safety valve is isolated from the cavity of the fender bladder by the receiving chamber. Accordingly, the safety valve can be safely detached from the mouth piece metal and safely attached to the mouth piece metal. Thus, the safety valve can be detached and attached from an in-use pneumatic fender while in use without bringing the pneumatic fender onto land or a marine vessel.

The mouth piece metal further includes the receiving chamber communication passage that connects the cavity of the receiving chamber and outside air and the receiving chamber open/close valve that opens and closes the receiving chamber communication passage. This configuration allows the safety valve to be isolated from the cavity of the fender bladder, thus allowing the receiving chamber open/close valve to be opened and the internal pressure of the cavity of the receiving chamber to be raised to the pressure threshold via the receiving chamber communication passage. In other words, a confirmation test of the valve opening pressure of the safety valve can be performed on the pneumatic fender while in use. In such a manner, according to the present technology, the safety valve can be detached and attached and a confirmation test of the valve opening pressure can be performed on the pneumatic fender while in use. As such, the labor and time required for these operations can be greatly reduced, and maintainability can be significantly enhanced.

DETAILED DESCRIPTION

Hereinafter, a pneumatic fender and a mouth piece metal for a pneumatic fender of the present technology will be described with reference to embodiments illustrated in the drawings.

Figure 1:
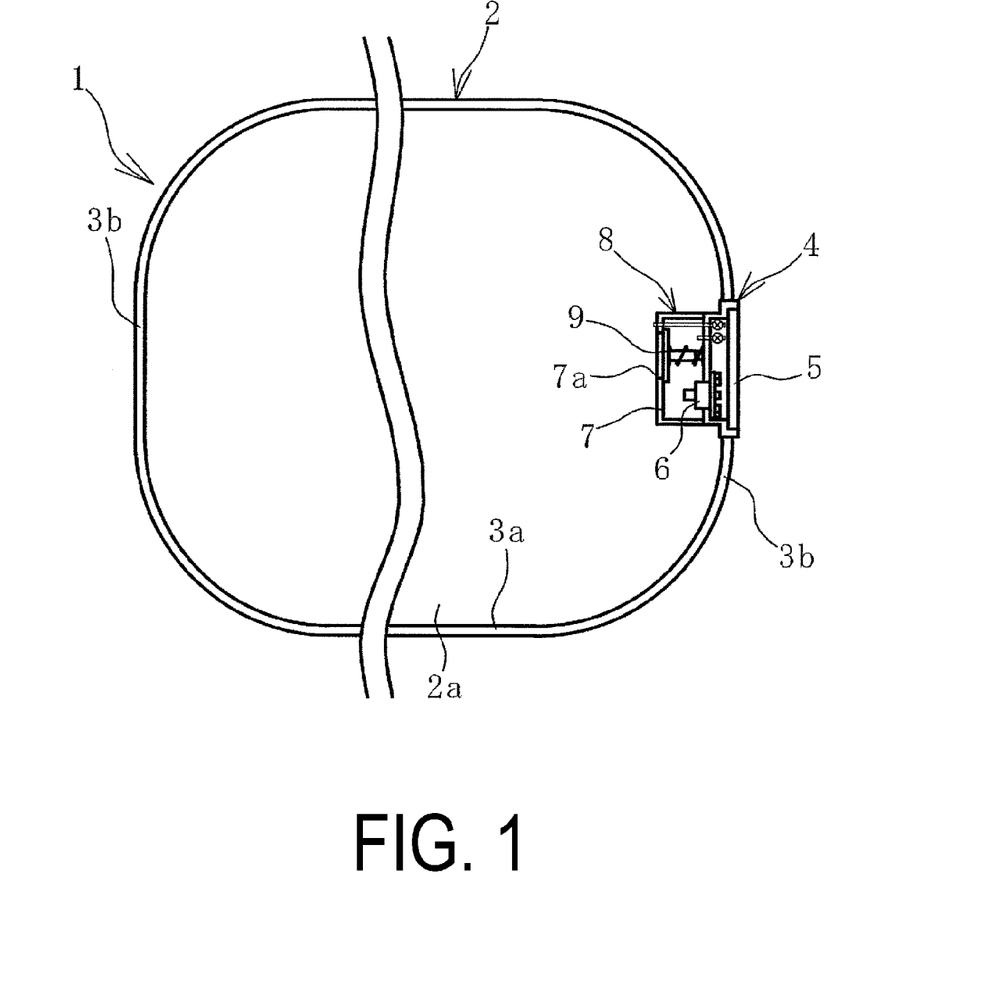
FIG. 1 is an overall schematic view illustrating a pneumatic fender of the present technology as viewed in a vertical cross-section.
Figure 2:
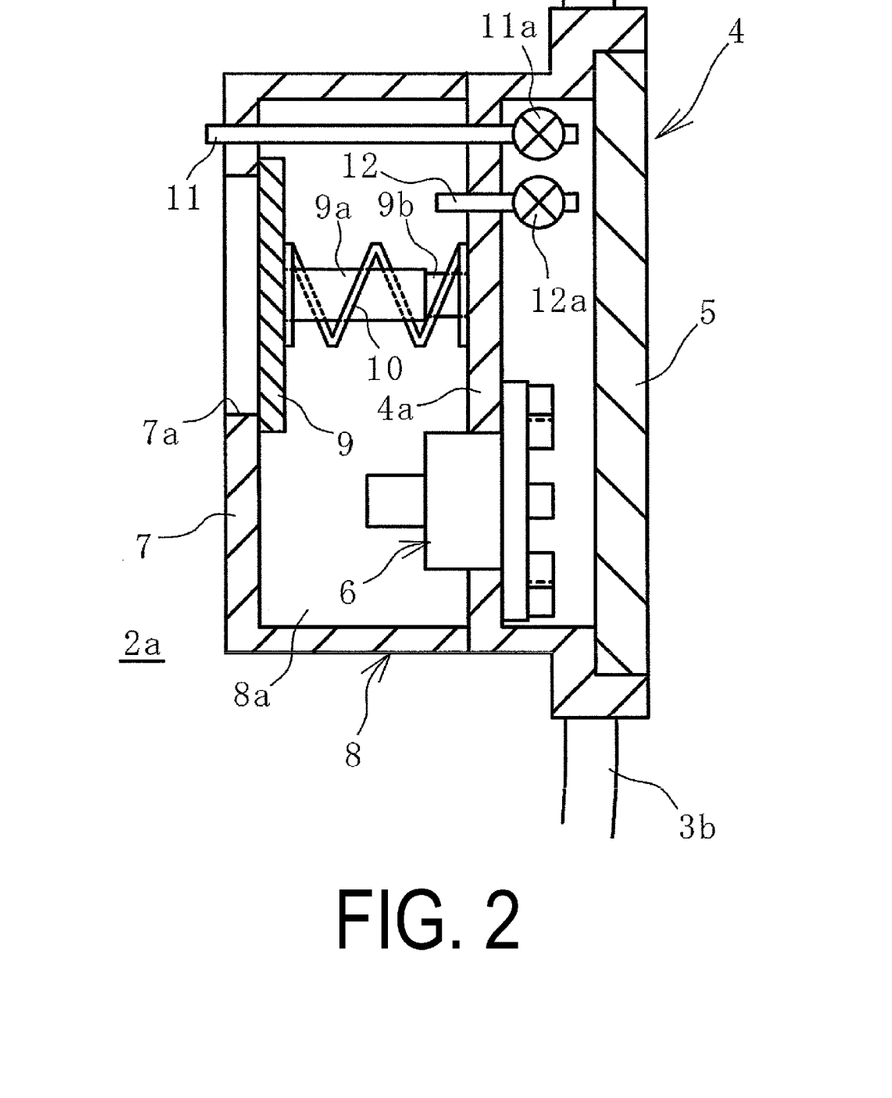
FIG. 2 is an enlarged view of the area around a mouth piece metal of the present technology illustrated in FIG. 1.
Figure 3:
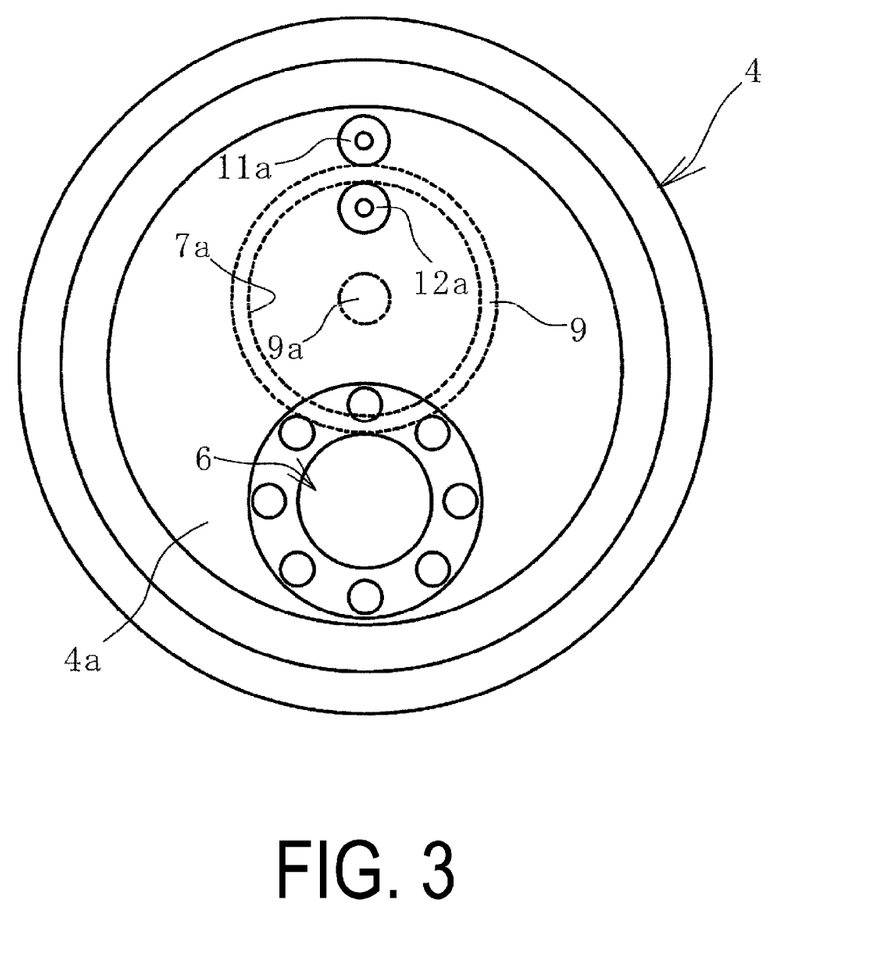
FIG. 3 is a plan view of the area around the mouth piece metal of the present technology illustrated in FIG. 1.

A pneumatic fender 1 (hereinafter, also fender 1) of the present technology illustrated in FIG. 1 to FIG. 3 includes a fender bladder 2 that is made mainly of rubber and has reinforcing material embedded therein. The fender bladder 2 is formed with a cylindrical portion 3a and a bowl-like hemispherical portion 3b on each end of the cylindrical portion 3a in the cylinder axial direction connected thereto.

A mouth piece metal 4 of the present technology is provided on one of the hemispherical portions 3b. The mouth piece metal 4 may also be provided on the hemispherical portion 3b on both sides. The mouth piece metal 4 is a recessed cylinder-like fitting. The opening of the mouth piece metal 4 is covered by a lid 5 attached by a bolt or the like.

The mouth piece metal 4 includes a safety valve 6, a communication passage 11 that connects a cavity 2a of the fender bladder 2 to the outside air, and a bladder open/close valve 11a that opens and closes the communication passage 11. Additionally, the mouth piece metal 4 includes a receiving chamber 8 that isolates the safety valve 6 from the cavity 2a, a through hole 7a formed in a dividing wall 7 constituting the receiving chamber 8, an open/close valve 9 that opens and closes the through hole 7a, a resilient member 10 that constantly biases the open/close valve 9, a receiving chamber communication passage 12 that connects a cavity 8a of the receiving chamber 8 to the outside air, and a receiving chamber open/close valve 12a that opens and closes the receiving chamber communication passage 12.

The receiving chamber 8 is formed extending toward the cavity 2a of the fender bladder 2 from a flat plate 4a on which the safety valve 6 is attached. The safety valve 6 is fixed to the flat plate 4a and extends through the flat plate 4a and into the cavity 8a of the receiving chamber 8. The communication passage 11 extends through the flat plate 4a and the receiving chamber 8 and terminates in the cavity 2a. The receiving chamber communication passage 12 extends through the flat plate 4a and terminates in the cavity 8a of the receiving chamber 8.

The through hole 7a connects the cavity 8a of the receiving chamber 8 and the cavity 2a of the fender bladder 2. The open/close valve 9 is larger than the through hole 7a and is disposed in the cavity 8a of the receiving chamber 8. The open/close valve 9 includes a large diameter shaft 9a and a small diameter shaft 9b able to extend from and retract into the large diameter shaft 9a. One end of the large diameter shaft 9a is fixed to the open/close valve 9. The end to the other side of the small diameter shaft 9b is fixed to the flat plate 4a. A resilient member 10 constantly biases the open/close valve 9 toward the closing direction of the through hole 7a. In the present embodiment, a metal coil spring is used as the resilient member 10. The coil spring 10 is disposed between the open/close valve 9 and the flat plate 4a with the large diameter shaft 9a and the small diameter shaft 9b passing through the coil spring 10.

So that the fender bladder 2 is not damaged when excessively compressed, the safety valve 6 opens when the pressure reaches a set pressure threshold Pm. The open/close valve 9, which is constantly biased toward the closing direction of the through hole 7a, has a configuration in which when an internal pressure P of the cavity 2a is less than the pressure threshold Pm but greater than a standard pressure Pc, which is the sum of a predetermined initial internal pressure Pi and an allowable pressure Pt, the open/close valve 9 opens, thus opening the through hole 7a. "Predetermined initial internal pressure Pi" corresponds to an internal pressure of the cavity 2a when the fender bladder 2 is not compressed and the pneumatic fender 1 is in a typical in-use state of neutrality. In other words, the open/close valve 9 that keeps the through hole 7a closed, opens the through hole 7a when the internal pressure P of the cavity 2a is greater than Pi+Pt but less than Pm.

When the pneumatic fender 1 is used, the cavity 2a is given the predetermined initial internal pressure Pi by being inflated with air A or filled with air A and fluid (water). In this state, the pneumatic fender 1 is disposed at the place of use such as a wharf. When the fender bladder 2 is not compressed and the pneumatic fender 1 is in a typical in-use state of neutrality, the through hole 7a is kept closed by the open/close valve 9.

Figure 4:
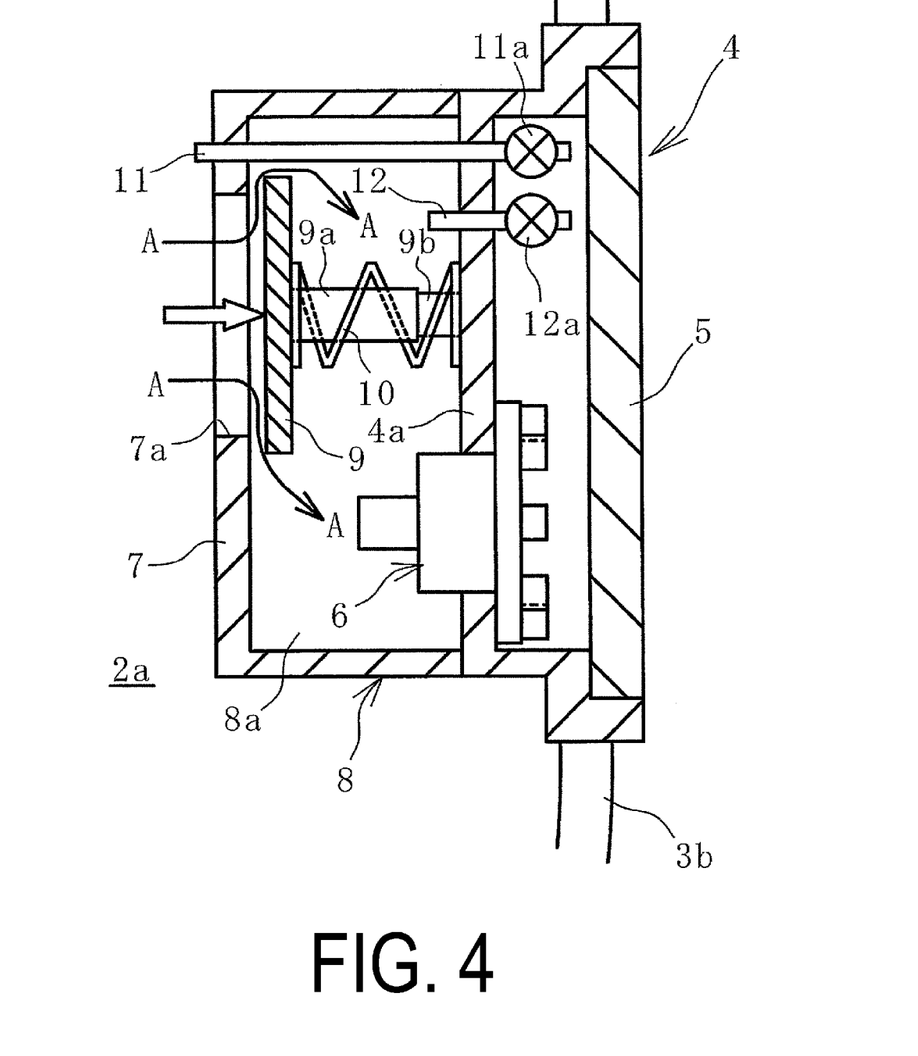
FIG. 4 is an explanatory drawing illustrating an open/close valve illustrated in FIG. 2 in an open state.

When the fender bladder 2 is compressed and the internal pressure P of the cavity 2a exceeds standard pressure Pc (i.e. P>Pi+Pt=Pc), as illustrated in FIG. 4, the open/close valve 9 acts against the biasing force of the resilient member 10, moves in the cylinder axial direction of the fender bladder 2, and opens. As a result, the cavity 2a and the cavity 8a of the receiving chamber 8 become connected via the through hole 7a. In this state, the internal pressure of the cavity 2a of the fender bladder 2 and the internal pressure of the cavity 8a of the receiving chamber 8 equalize.

When the fender bladder 2 is further compressed and the internal pressure P of the cavity 2a exceeds the pressure threshold Pm, the internal pressure of the cavity 8a is also exceeded. This causes the safety valve 6 to open. When the internal pressure P of the cavity 2a exceeds the pressure threshold Pm by the fender bladder 2 being excessively compressed in such a manner, the safety valve 6 functions as per convention to connect the cavity 2a to the outside air, thus lowering the internal pressure P of the cavity 2a to the pressure threshold Pm or less. As a result, damage to the fender bladder 2 can be prevented.

When the internal pressure P of the cavity 2a of the fender bladder 2 is equal to or less than the standard pressure Pc (i.e. P<Pi+Pt=Pc), the open/close valve 9 is closed thus keeping the through hole 7a closed, when the pneumatic fender 1 is in the typical in-use state, the through hole 7a is closed and the safety valve 6 is isolated from the cavity 2a of the fender bladder 2 by the receiving chamber 8. Accordingly, the safety valve 6 can be safely detached from the mouth piece metal 4 and safely attached to the mouth piece metal 4. Thus, the safety valve 6 can be detached and attached from an in-use pneumatic fender 1 while in use without bringing the pneumatic fender 1 onto land or a marine vessel.

Additionally, with the pneumatic fender 1 in typical in-use state with the open/close valve 9 thus keeping the through hole 7a closed, by opening the receiving chamber open/close valve 12a and injecting compressed air into the cavity 8a of the receiving chamber 8 via the receiving chamber communication passage 12, the internal pressure of the cavity 8a can be raised to the pressure threshold Pm. In other words, a confirmation test of the valve opening pressure of the safety valve 6 can be performed on the pneumatic fender 1 while in use. In such a manner, according to the present technology, the safety valve 6 can be detached and attached and a confirmation test of the valve opening pressure can be performed on the pneumatic fender 1 while in use. As such, the labor and time required for these operations can be greatly reduced, and maintainability can be significantly enhanced.

The allowable pressure Pt is set to, for example, from 5 to 20%, both inclusive, of the predetermined initial internal pressure Pi and more preferably from 5 to 10%, both inclusive. The allowable pressure Pt being less than 5% of the predetermined initial internal pressure Pi would result in a state in which the open/close valve 9 frequently opens the through hole 7a. This would make detaching the safety valve 6 from the mouth piece metal 4 difficult. The allowable pressure Pt being greater than 20% of the predetermined initial internal pressure Pi would result in the safety valve 6 not being able to open speedily without time lag when the internal pressure P of the cavity 2a of the fender bladder 2 suddenly reaches the pressure threshold Pm.

The area of the opening of the through hole 7a is preferably as large as possible to allow the safety valve 6 to open speedily without time lag when the internal pressure P of the cavity 2a of the fender bladder 2 suddenly reaches the pressure threshold Pm. For example, the area of the opening of the through hole 7a may be from 3 to 5 times that of the pressure detection portion of the safety valve 6.

The resilient member 10 preferably includes a coil spring as in the present embodiment. Various kinds of coil springs are available. As such, a coil spring with the desired biasing force and durability can be easily found. Alternatively, an elastic member made of rubber or the like, a leaf spring, and the like may be used as the resilient member 10.

Figure 5:
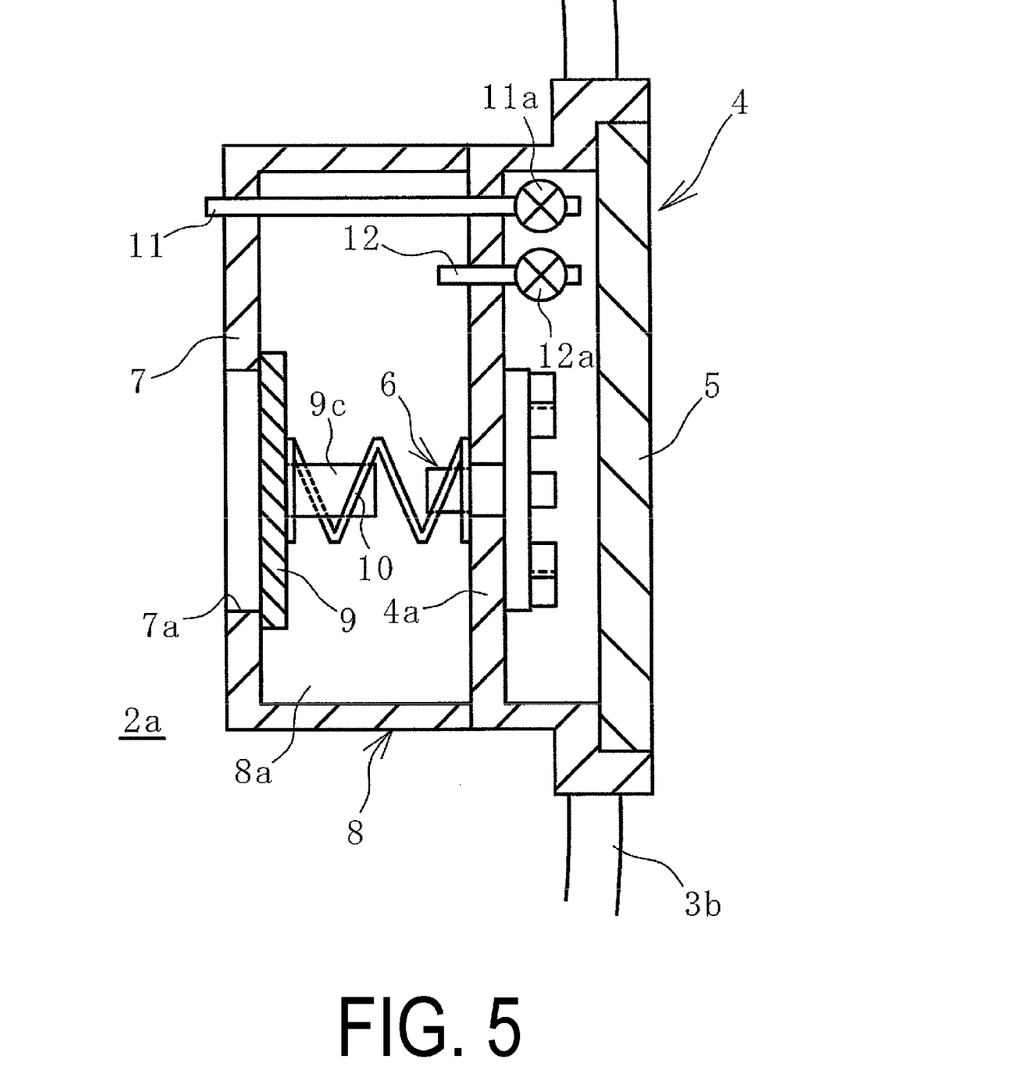
FIG. 5 is an explanatory drawing illustrating a mouth piece metal of another embodiment of the present technology as viewed in a vertical cross-section.

In another embodiment of the mouth piece metal 4 illustrated in FIG. 5, the safety valve 6 and the through hole 7a are disposed coaxially to the axis of the cylinder axial direction of the fender bladder 2, and the open/close valve 9 moves in the cylinder axial direction of the fender bladder 2 to open and close the through hole 7a. A support shaft 9c that extends toward the safety valve 6 has one end fixed to the open/close valve 9. The support shaft 9c and the safety valve 6 are arranged coaxially to the axis of the cylinder axial direction of the fender bladder 2. The support shaft 9c and a portion of the safety valve 6 protruding from the flat plate 4a are inserted in either end of the coil spring 10. According to the mouth piece metal 4 of this embodiment, the space required for the open/close valve 9 can be reduced.

The invention claimed is:

1. A pneumatic fender comprising:
 a fender bladder including a cylindrical portion and bowl-like hemispherical portions connected to each end of the cylindrical portion;
 a mouth piece metal disposed on at least one of the hemispherical portions,
 the mouth piece metal including:
 a safety valve that, upon an internal pressure of a cavity of the fender bladder reaching a pressure threshold, opens to connect the cavity of the fender bladder to outside air and reduce the internal pressure, and
 a communication passage that connects the cavity of the fender bladder and outside air; and
 a bladder open/close valve that opens and closes the communication passage; wherein
 the mouth piece metal further includes:
 a receiving chamber that isolates the safety valve from the cavity of the fender bladder,
 a through hole that connects a cavity of the receiving chamber and the cavity of the fender bladder, the through hole being formed on a dividing wall constituting the receiving chamber, an open/close valve that opens and closes the through hole, a resilient member that constantly biases the open/close valve toward a closing direction of the through hole, a receiving chamber communication passage that connects the cavity of the receiving chamber and outside air, and a receiving chamber open/close valve that opens and closes the receiving chamber communication passage; and upon the internal pressure of the cavity of the fender bladder being less than the pressure threshold and greater than a standard pressure, which is a sum of a predetermined initial internal pressure and an allowable pressure, the open/close valve opens, opening the closed through hole.

2. The pneumatic fender according to claim 1, wherein the allowable pressure is from 5 to 20%, both inclusive, of the predetermined initial internal pressure.

3. The pneumatic fender according to claim 2, wherein the resilient member is a coil spring.

4. The pneumatic fender according to claim 3, wherein the safety valve and the through hole are disposed coaxially to a cylinder axial direction of the fender bladder, and the open/close valve moves in the cylinder axial direction to open and close the through hole.

5. The pneumatic fender according to claim 1, wherein the resilient member is a coil spring.

6. The pneumatic fender according to claim 1, wherein the safety valve and the through hole are disposed coaxially to a cylinder axial direction of the fender bladder, and the open/close valve moves in the cylinder axial direction to open and close the through hole.

7. A mouth piece metal for a pneumatic fender comprising:

a safety valve that, upon an internal pressure of a cavity of a fender bladder reaching a pressure threshold, opens to connect the cavity of the fender bladder to outside air and reduce the internal pressure;

a communication passage that connects the cavity of the fender bladder and outside air; and a bladder open/close valve that opens and closes the communication passage;

the mouth piece metal being attached to a bowl-like hemispherical portion constituting the fender bladder; wherein the mouth piece metal further includes:

a receiving chamber that isolates the safety valve from the cavity of the fender bladder, a through hole that connects a cavity of the receiving chamber and the cavity of the fender bladder, the through hole being formed on a dividing wall constituting the receiving chamber, an open/close valve that opens and closes the through hole, a resilient member that constantly biases the open/close valve toward a closing direction of the through hole, a receiving chamber communication passage that connects the cavity of the receiving chamber and outside air, and a receiving chamber open/close valve that opens and closes the receiving chamber communication passage; and upon the internal pressure of the cavity of the fender bladder being less than the pressure threshold and greater than a standard pressure, which is a sum of a predetermined initial internal pressure and an allowable pressure, the open/close valve opens, opening the closed through hole.

8. The mouth piece metal for a pneumatic fender according to claim 7, wherein the allowable pressure is from 5 to 20%, both inclusive, of the predetermined initial internal pressure.

9. The mouth piece metal for a pneumatic fender according to claim 8, wherein the resilient member is a coil spring.

10. The mouth piece metal for a pneumatic fender according to claim 9, wherein the safety valve and the through hole are disposed coaxially to a cylinder axial direction of the fender bladder, and the open/close valve moves in the cylinder axial direction to open and close the through hole.

11. The mouth piece metal for a pneumatic fender according to claim 7, wherein the resilient member is a coil spring.

12. The mouth piece metal for a pneumatic fender according to claim 7, wherein the safety valve and the through hole are disposed coaxially to a cylinder axial direction of the fender bladder, and the open/close valve moves in the cylinder axial direction to open and close the through hole.

* * * * *